March 15, 1960  F. C. SODERBERG  2,928,629
LANDING GEAR CONTROL SWITCH FOR AIRPLANES
Filed May 9, 1956  2 Sheets-Sheet 1
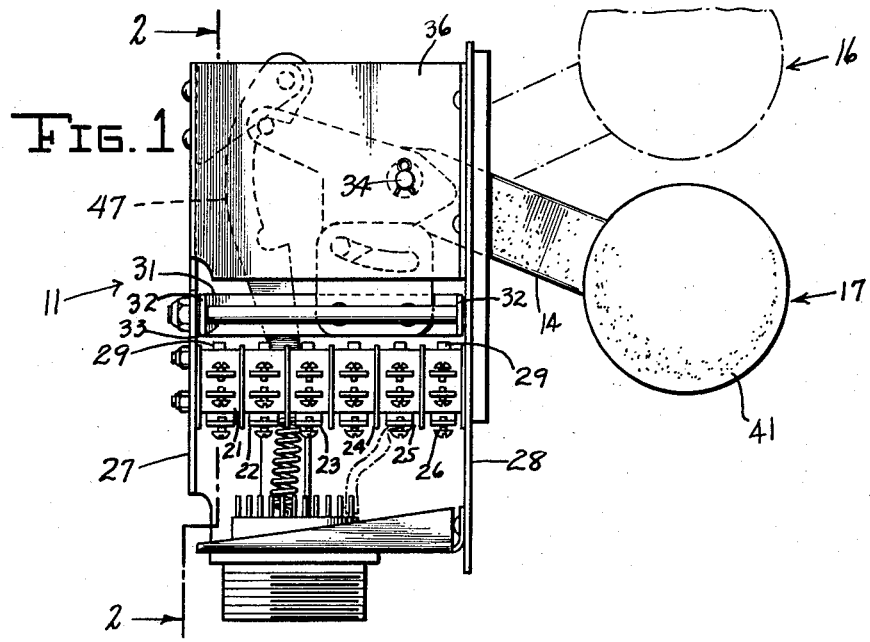
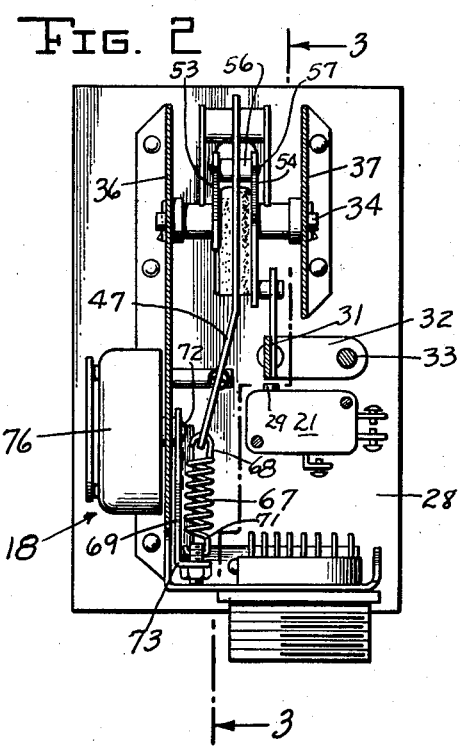
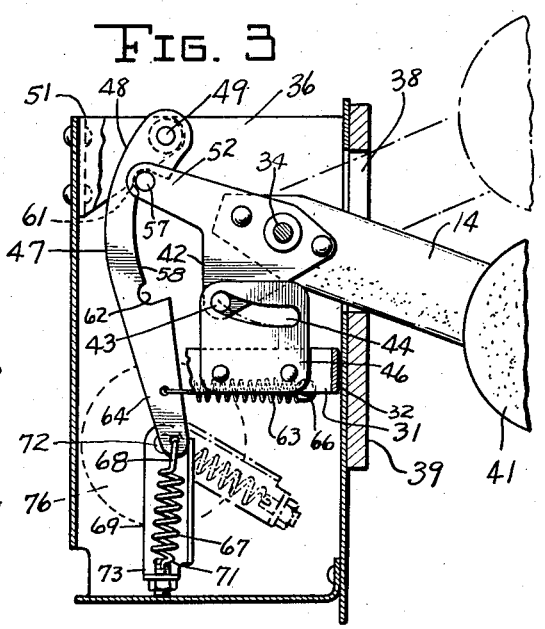
INVENTOR.
FREDERICK C. SODERBERG
BY
ATTORNEY.

March 15, 1960   F. C. SODERBERG   2,928,629
LANDING GEAR CONTROL SWITCH FOR AIRPLANES
Filed May 9, 1956   2 Sheets-Sheet 2
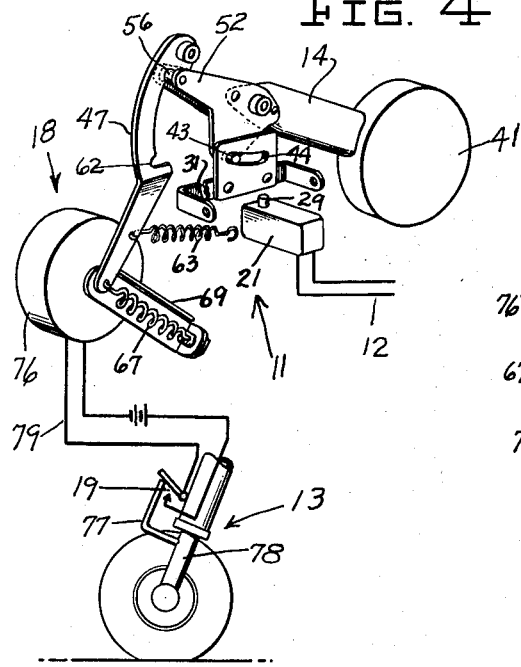
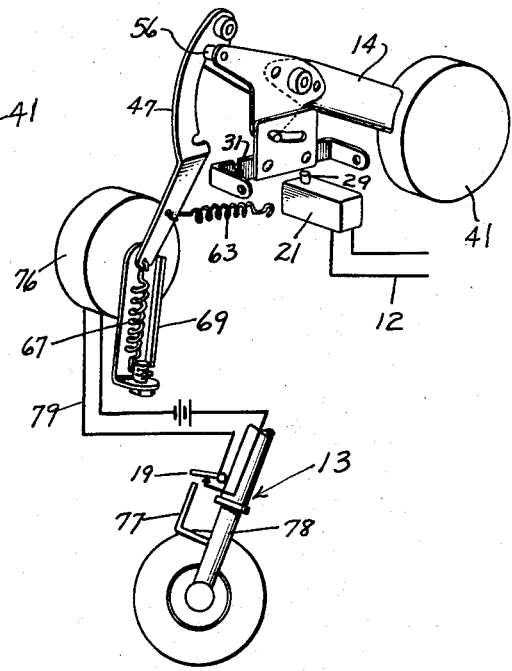
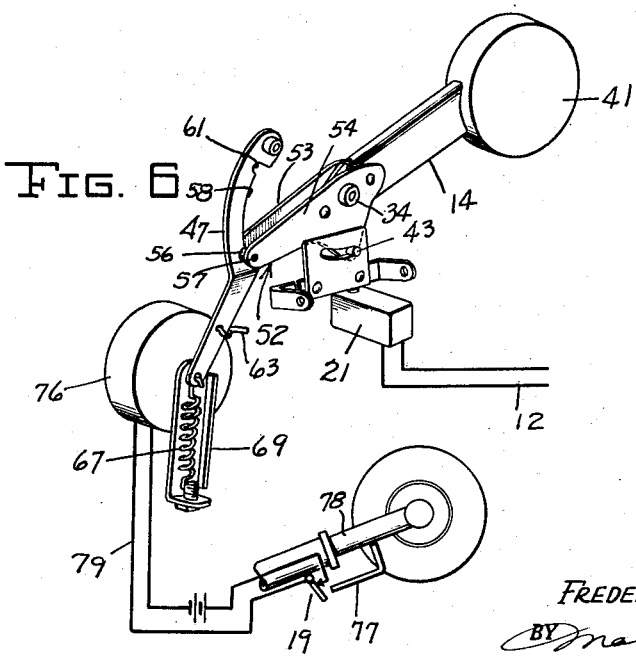
INVENTOR.
FREDERICK C. SODERBERG
BY
ATTORNEY United States Patent Office 2,928,629
Patented Mar. 15, 1960

2,928,629
LANDING GEAR CONTROL SWITCH FOR AIRPLANES

Frederick C. Soderberg, San Marino, Calif.

Application May 9, 1956, Serial No. 583,663

4 Claims. (Cl. 244—102)

The invention relates to control apparatus and circuitry for the power motive means for raising and lowering the landing gear of an airplane.

In airplane construction the raising and lowering of the landing gear is effected by power operation under the control of the operator but modified as required for safety conditions. For example, the pilot's control, as effected by a manually operated switch, may be modified by a second pressure-operated or limit switch located on and operated by the landing gear itself so that when the plane is on the ground the landing gear switch will be actuated to open position and thereby prevent the pilot raising the landing gear mechanism before the wheels are off the ground. In these systems it is possible, however, for the pilot to throw his manually controlled switch to landing gear raising position prior to take-off and then depend upon the lifting of the plane and removal of weight from the landing gear to close the second limit switch, to thereby cause the landing gear to raise automatically as the plane takes off from the ground. Accidents, however, have occurred in instances where this latter operation was followed when the wheels struck a bump or the like, which momentarily took the pressure off from the wheels and thereby put the power raising mechanism into operation before the plane had attained a take-off speed.

It is a principal object of the present invention to provide a landing gear control switch for airplanes which will prevent the pilot from throwing the switch to raise the landing gear before the wheels are off the ground.

Another object of the present invention is to provide a landing gear control switch of the character described which, while being normally locked against operation until after the aircraft has safely completed its take-off, may nevertheless be forcibly and deliberately operated at any time by the pilot where conditions may so require.

A further object of the present invention is to provide a landing gear control switch of the character above which is composed of a minimum number of sturdily formed parts well adapted to afford long and trouble-free operation.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of a landing gear control switch constructed in accordance with the present invention.

Figure 2 is a vertical cross-sectional view of the switch taken substantially on the plane of line 2—2 of Figure 1.

Figure 3 is a vertical cross-sectional view of the switch taken substantially on the plane of line 3—3 of Figure 2.

Figure 4 is a diagrammatic representation of the switch and landing gear showing the switch in a landing gear down position and the landing gear in ground-supporting position.

Figure 5 is a diagrammatic representation similar to Figure 4 but showing the landing gear in its down but airborne position.

Figure 6 is a diagrammatic representation similar to Figures 4 and 5 but showing the switch in its landing gear up position and with the landing gear raised (retracted).

The landing gear control switch 11 of the present invention is adapted for connection in the control circuit 12 for the motive means (not shown) for raising and lowering an airplane landing gear 13 and includes a manually engageable arm 14 operating the switch and normally movable with relatively small manually applied force to and between landing gear up position 16, denoted in dotted lines in Figures 1 and 3 and in full lines in Figure 6, and landing gear down position 17 shown in full lines in Figures 1, 3, 4 and 5; and power operated means 18 adapted for operative connection, see switch 19, to the landing gear 13 and activated in the lowered ground-supporting position of the landing gear for restraining the movement of the arm 14 from its down position 17 except on the application of a relatively large manually applied force.

While a single landing gear 13 is depicted for clarity of illustration in the drawings, it will be understood that the airplane may have several landing gears such as the nose and outboard landing gears, and these may be retained in airborne position in interior compartments having power-operated flaps or doors, the opening and closing of which is synchronized with the raising and lowering of the landing gear. Accordingly switch 11 is provided with a bank of switches 21, 22, 23, 24, 25 and 26 which may be simultaneously operated to properly energize and deenergize the control circuits for the several power operating mechanisms for the landing gears, doors, etc. These switches 21–26 are commonly of the light, snap acting type sometimes referred to as microswitches and they are here mounted in bank between opposed sides 27 and 28 of a frame for the switch with their displaceable operating control arms 29 uppermost and in a common transverse plane for simultaneous engagement and displacement by a switch bar 31 which is mounted for vertical reciprocation in the frame for actuation of the switches 21–26. As will be observed, the switch bar 31 is provided at its opposite ends with lever arms 32 which are pivotally secured to a cross-pin 33 carried by the frame sides 27—28.

Raising and lowering of the bar 31 is under the control of the switch arm 14. The latter is pivotally mounted intermediate its length on a cross-pin 34 which is supported on opposed frame sides 36 and 37 (see Figure 2). The arm 14 extends outwardly through an opening 38 in the front panel 39 for the switch and is provided at its outer end with a round handle member 41 for convenient manual engagement for raising and lowering. Member 41 may be made of plastic or other suitable light-transmitting material and may be illuminated by an interiorly positioned lamp bulb (not shown). The inner end portion of the arm adjacent but inwardly from the pivot shaft 34, is provided with a depending lug 42 (see Figure 3) which carries a pin 43 mounted in a cam slot 44 provided in a plate 46 affixed to the switch bar 31. Accordingly upon raising of the switch arm 14, as indicated in dotted lines in Figures 1 and 3, the pin 43 will swing downwardly in slot 44 to force a downward movement of bar 31 against the switch arms 29 to actuate the switches in the bank 21–26. Contrariwise, lowering of the switch arm 14 to its position as indicated in full lines in Figures 1 and 3, will raise bar 31 to release the pressure on switch arms 29 to thereby permit the switches to move under their normally built-in bias to their normal open or closed position, as the case may be.

The power-operated means 18 for restraining the movement of the switch arm 14 as above described, includes a latch bar 47 (see Figures 2 and 3) which is pivoted at its upper end 48 on a pin 49 secured between the sides of a U-shaped frame piece 51 so as to position the latch bar 47 in generally depending relation from the pivot pin 49 and in juxtaposition to the inner end 52 of the switch arm 14. This inner arm end, as will be best observed from Figures 2 and 6, is composed of a pair of spaced parallel sides 53 and 54 which carry at their inner extremities a transversely arranged roller 56 mounted on a cross-pin 57 and positioned for rolling sliding engagement against the confronting edge surface 58 of the latch bar 47, the latch bar being mounted with its plane medially between the arm sides 53—54. In accordance with the present invention the latch bar is provided with spaced recess or socket portions 61 and 62 positioned for engagement with and releasably retaining the roller 56 in the terminal positions 16—17 of the arm, the recess 61 functioning to retain the arm in its lower position 17, and recess 62 functioning to retain the arm in its raised position 16. A spring 63, connected between the lower end 64 of the latch bar and a frame supported pin 66, normally retains the bar in a forwardly swung position in contact with the roller while yieldably permitting the movement of the roller into and out of the recesses 61—62 with a relatively small manually applied force. A second and somewhat more powerful spring 67 is connected at one end 68 to the lower end 64 of the latch bar and is provided with a movable mounting 69 for its opposite end 71. Mounting 69 may be moved to operative and inoperative positions, as shown in dotted and full lines in Figure 3, disposing the spring 67 generally perpendicular to and parallel with the latch bar 47 for adding and not adding appreciable latching strength to the bar to retain the arm 14 in the socket portions 61—62 except on the application of a relatively large manually applied force. This movement or orientation of the spring 67 is effected by a rotary arm providing the mounting 69 and which is pivoted for movement on a shaft 72 adjacent the lower end 64 of the latch bar (see Figure 3) for swinging movement of its opposite end 73 (carrying spring end 71) to a position, shown in dotted lines in Figure 3, in which spring 67 adds its resilience to spring 63 so as to practically lock the roller in one of its recesses 61—62 while still permitting a forced displacement when required. On the other hand the lever arm 69 may be swung to a depending position generally aligned with the length of the latch bar 47 and wherein the spring 67 is essentially neutralized or immobilized and in which position the switch arm 14 may be freely moved to and from its terminal positions. The locking action of spring 67 is so designed that a force of approximately 35 pounds must be applied to the handle 41 of the switch arm in order to override the locking action of the mechanism. This is of course possible where required in the case of an emergency.

Displacement of the arm 69 between its locking and unlocking positions is under the control of and is responsive to the landing gear position. Accordingly a power-operated means such as a rotary type solenoid 76 is used to actuate the arm 69 and is in turn controlled by the landing gear switch 19, the arrangement being such that when the landing gear is in down ground-supporting position, as shown in Figure 4, the lever arm 69 will be swung to its locking position as shown, and, contrariwise, when the landing gear is in airborne position the control arm 69 will be swung to its unlocking position as shown in Figures 5 and 6. The solenoid 76 is here mounted on frame side 36 and provides the rotary shaft 72. Preferably the solenoid is biased to normally (when deenergized) hold arm 69 in its locking position. Switch 19 is carried by the landing gear and actuated by an arm 77 fastened to the relatively movable depending part 78 of the landing gear. When the airplane is on the ground and the landing gear in its down ground-supporting position, as depicted in Figure 4, arm 77 will actuate switch 19 to open position, thus opening the electrical circuit 79 connecting the switch 19 and the solenoid, and deenergizing the solenoid and causing movement of arm 69 to its locking position. When the airplane takes off and the landing gear is airborne, landing gear part 78 drops down as depicted in Figure 5 of the drawings, thus releasing switch 19 and permitting it to close under a built-in bias. Under this condition solenoid 76 is energized and it overcomes its built-in bias to rotate arm 69 to its unlocking position. The pilot may then easily raise handle 41 to effect a raising of the landing gear. This latter arrangement is depicted in Figure 6 wherein switch 19 remains closed, thereby holding arm 69 in its unlocking position during the normal flight of the airplane. Should an electrical failure occur in the control circuit 79 the pilot may nevertheless, by the application of sufficient force, override the locking action of the latch mechanism as above explained.

I claim:

1. In a control system for a power-operated landing gear for an airplane having a landing gear actuated switch adapted for connection to said landing gear for opening and closing in the ground-supported and airborne positions of said landing gear and a landing gear control circuit for controlling the operation of said landing gear between landing gear up and landing gear down positions, an electric control circuit, an electric switch adapted for connection in said landing gear control circuit and including a manually engageable arm operating said electric switch and movable to and between landing gear up and landing gear down positions, a latch bar engageable with said arm and permitting movement thereof as aforesaid with relatively small manually applied force, a spring connected to said bar and having a mounting movable between operable and inoperable positions and functioning in said operable position to add latching strength to said bar to thereby retain said arm against movement from said down position except on the application of a relatively large manually applied force, and power operated means connected to said mounting for effecting movement thereof, said power operated means being connected to said landing gear actuated switch to cause movement of said mounting to said operable position in the ground-supported position of said landing gear.

2. In an airplane landing gear, a control system having a landing gear actuated switch, an electric switch having a manual control arm movable to and between landing gear up and landing gear down positions, a latch bar and resilient biasing means therefor engageable with said arm and permitting relatively easy movement thereof, a spring having one end connected to said bar, and a solenoid connected to the opposite end of said spring and movable to operable and inoperable positions adding and not adding appreciable latching strength to said bar, said solenoid being connected to said landing gear actuated switch for causing movement of said solenoid to said operable position in the ground-supporting position of said landing gear.

3. In an airplane landing gear, a control system having a landing gear actuated switch, an electric switch having a manual control arm movable to and between terminal landing gear up and landing gear down positions, a latch bar mounted for positioning in sliding engagement with said arm and having spaced socket portions positioned for engagement with and for releasably retaining said arm in said terminal positions, a spring connected to said latch bar and permitting movement of said arm from said socket portions with relatively small manually applied force, a second spring having one end connected to said bar, a mounting for the opposite end of said second spring movable to operable and inoperable positions disposing said second spring generally perpendicular and parallel to said bar for adding and not adding appreciable latching strength to said bar to retain said arm in said socket portions except on application of a relatively large manually applied force, a solenoid connected to said mounting for movement thereof to said operative and inoperative positions, said solenoid being connected to said landing gear actuated switch to cause movement of said mounting to said operable position in the ground-supporting position of said landing gear.

4. In an airplane landing gear, a control system having a landing gear actuated switch adapted for connection to said landing gear for opening and closing in response to the ground-supporting and airborne positions of said landing gear, an electric switch having a manual control arm movable to and between terminal landing gear up and landing gear down positions, a latch bar mounted for positioning in sliding engagement with said arm and having spaced socket portions positioned for engagement with and for releasably retaining said arm in said terminal positions, a spring connected to said latch bar and permitting movement of said arm from said socket portions with relatively small manually applied force, a second spring having one end connected to said bar, and a rotary solenoid connected to the opposite end of said second spring and rotatable to operable and inoperable positions orienting said spring generally perpendicular and parallel to said bar for adding and not adding appreciable latching strength to said bar to retain said arm in said socket portions except on application of a relatively large manually applied force, said solenoid being connected to said landing gear actuated switch to cause movement of said solenoid to operable position in the ground-supporting position of said landing gear.

References Cited in the file of this patent

UNITED STATES PATENTS

| 2,793,541 | Borcherdt | May 28, 1957 |

FOREIGN PATENTS

| 175,724 | Great Britain | Feb. 16, 1922 |
| 539,128 | Great Britain | Aug. 28, 1941 |
| 547,282 | Great Britain | Aug. 20, 1942 |
| 847,546 | France | July 3, 1939 |